(12) United States Patent
Schumacher et al.

(10) Patent No.: US 7,959,209 B2
(45) Date of Patent: Jun. 14, 2011

(54) CLOSURE FOR A MOVABLE ROOF

(75) Inventors: Thorsten Schumacher, Kummerfeld (DE); Holger Klemm, Hamburg (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 359 days.

(21) Appl. No.: 12/348,986

(22) Filed: Jan. 6, 2009

(65) Prior Publication Data
US 2009/0179453 A1    Jul. 16, 2009

(30) Foreign Application Priority Data
Jan. 10, 2008 (DE) .......................... 10 2008 003 880

(51) Int. Cl.
*B60J 7/185* (2006.01)
(52) U.S. Cl. ........................................ 296/121; 296/224
(58) Field of Classification Search .................. 296/121, 296/224; 292/DIG. 5
See application file for complete search history.

(56) References Cited

U.S. PATENT DOCUMENTS

| | | | | |
|---|---|---|---|---|
| 1,892,512 A | * | 12/1932 | Kemp | 292/39 |
| 4,830,425 A | * | 5/1989 | Muscat | 296/121 |
| 5,678,881 A | * | 10/1997 | Tokarz | 296/121 |
| 6,158,786 A | | 12/2000 | Droste et al. | |
| 6,520,560 B2 | | 2/2003 | Schutt et al. | |
| 6,834,907 B2 | | 12/2004 | Dietl | |
| 7,226,110 B2 | * | 6/2007 | Doncov et al. | 296/121 |
| 7,407,201 B2 | | 8/2008 | Pfertner et al. | |
| 7,513,563 B2 | * | 4/2009 | Guillez et al. | 296/121 |
| 7,559,585 B2 | * | 7/2009 | Plesternings et al. | 292/201 |
| 7,581,777 B2 | * | 9/2009 | Neubrand | 296/121 |
| 7,731,267 B2 | * | 6/2010 | Habacker | 296/121 |
| 7,762,612 B2 | * | 7/2010 | Brockhoff | 296/121 |
| 2002/0185887 A1 | * | 12/2002 | Hasselgruber et al. | 296/121 |
| 2003/0141741 A1 | * | 7/2003 | Obendiek | 296/121 |
| 2003/0146643 A1 | | 8/2003 | Dietl | |
| 2008/0290688 A1 | | 11/2008 | Brockhoff | |

FOREIGN PATENT DOCUMENTS

| | | |
|---|---|---|
| DE | 295 09 876 | 9/1995 |
| DE | 197 21 229 | 11/1998 |
| DE | 101 24 937 | 8/2002 |
| DE | 102 05 144 | 8/2003 |
| DE | 10 2005 034 726 | 1/2007 |

* cited by examiner

*Primary Examiner* — H Gutman
(74) *Attorney, Agent, or Firm* — Brooks Kushman P.C.

(57) ABSTRACT

A closure assembly for a vehicle includes a hook movable between locked and unlocked positions. An actuator is connected to the hook and is linearly movable to move the hook between the locked and unlocked positions. First and second rotatable gears are engaged with one another such that either gear rotates as the other gear rotates. First and second levers are respectively connected between the gears and the actuator. The levers move as the gears rotate in response to the first gear rotating in a first rotary direction and thereby cause the actuator to move linearly in a first direction to thereby move the hook to the locked position. The levers move as the gears rotate in response to the first gear rotating in a second rotary direction and thereby cause the actuator to move linearly in a second direction to thereby move the hook to the unlocked position.

19 Claims, 7 Drawing Sheets

CLOSURE FOR A MOVABLE ROOF

CROSS-REFERENCE TO RELATED APPLICATIONS

This application claims foreign priority benefits under 35 U.S.C. §119(a)-(d) to DE 10 2008 003 880.6, filed Jan. 10, 2008, which is hereby incorporated by reference in its entirety.

BACKGROUND OF THE INVENTION

1. Field of the Invention

The present invention relates to closure assemblies for movable roofs of vehicles.

2. Background Art

DE 10 2004 046 098 A1 (corresponding to U.S. Pat. No. 7,407,201) describes a closure assembly for a movable roof of a vehicle. The closure assembly acts between the roof and the vehicle windshield frame and includes a slide linkage-controlled locking hook. The locking hook may move between closed and opened positions via a guide device. The locking hook cooperates with a hook guide in mechanical linkage with a motorized gearing assembly.

DE 100 00 002 A1 (corresponding to U.S. Pat. No. 6,520,560) describes a locking assembly for a movable roof of a vehicle. The locking assembly includes a locking hook that is movably mounted on a portion of the roof. The locking hook may be affixed to a cowl of the vehicle in a locking engagement using a drive device. The locking hook is movable in a swivel-displacement motion relative to a guide part of the roof portion in order to locked the roof closed. The guide part is in guiding engagement with a guide track of the locking hook.

DE 101 24 937 C1 describes a locking assembly for a movable roof of a vehicle. The locking assembly includes a locking hook which may be locked to a counter-bearing fixed to the vehicle. A rocker arm containing a drive slide element and an output slide element is pivotably supported on a front frame section of the roof.

SUMMARY OF THE INVENTION

An object of the present invention includes a closure assembly for a movable roof of a vehicle in which the closure assembly is implemented relatively easily and functions well with relatively favorable space requirements.

In carrying out the above object and other objects, the present invention provides a closure assembly for locking and unlocking a movable roof to and from a vehicle frame. The closure assembly includes a locking hook, an actuator, and gearing. The locking hook has first and second ends. The first end of the locking hook has a hook section. The locking hook is movable between a locked position in which the hook section is engageable with a vehicle frame and an unlocked position in which the hook section is disengageable from the vehicle frame. The actuator is connected to the second end of the locking hook. The actuator is linearly movable between a first position in which the actuator causes the locking hook to move to the locked position and a second position in which the actuator causes the locking hook to move to the unlocked position. The gearing has first and second gears and first and second levers. The gears are rotatable in a common plane about respective rotational axes and are engaged with one another such that either gear rotates in response to the other gear rotating. The first lever is connected at one end to the first gear and is connected at another end to the actuator and the second lever is connected at one end to the second gear and is connected at another end to the actuator. The levers move as the gears rotate about the rotational axes in response to the first gear rotating in a first rotary direction and thereby cause the actuator to move linearly in a first direction to thereby move the locking hook to the locked position. The levers move as the gears rotate about the rotational axes in response to the first gear rotating in a second opposite rotary direction and thereby cause the actuator to move linearly in a second opposite direction to thereby move the locking hook to the unlocked position.

Further, in carrying out the above object and other objects, the present invention provides an assembly having a movable roof and an associated closure assembly.

Advantages achieved by a closure assembly in accordance with embodiments of the present invention are that, due to the ideal design of the gearwheels ("gears") and levers, which allow a compact structure and have low space requirements and which may be accommodated on the movable roof in an ideal manner, the closure assembly which is to act between the roof and a vehicle (e.g., windshield) frame functions well and is easily implemented. Because of their identical design, the gears and levers represent ideal components which have superior function and a long service life. This is also assisted by the rotational axes of the gears and the articulated axes of the levers. Furthermore, the actuator may include a base plate having a bearing support bracket and guide tracks and the closure assembly may further include a receiving element and a slide support which are components which may be manufactured and installed with a reasonable level of effort. Force absorption devices counteract uncontrolled release of the closure assembly from its locked position, for example under the effect of frontal or rear impact damage sustained by the vehicle. Lastly, the closure assembly may thus be actuated in a targeted and functionally correct manner when it is provided with a corresponding drive unit.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
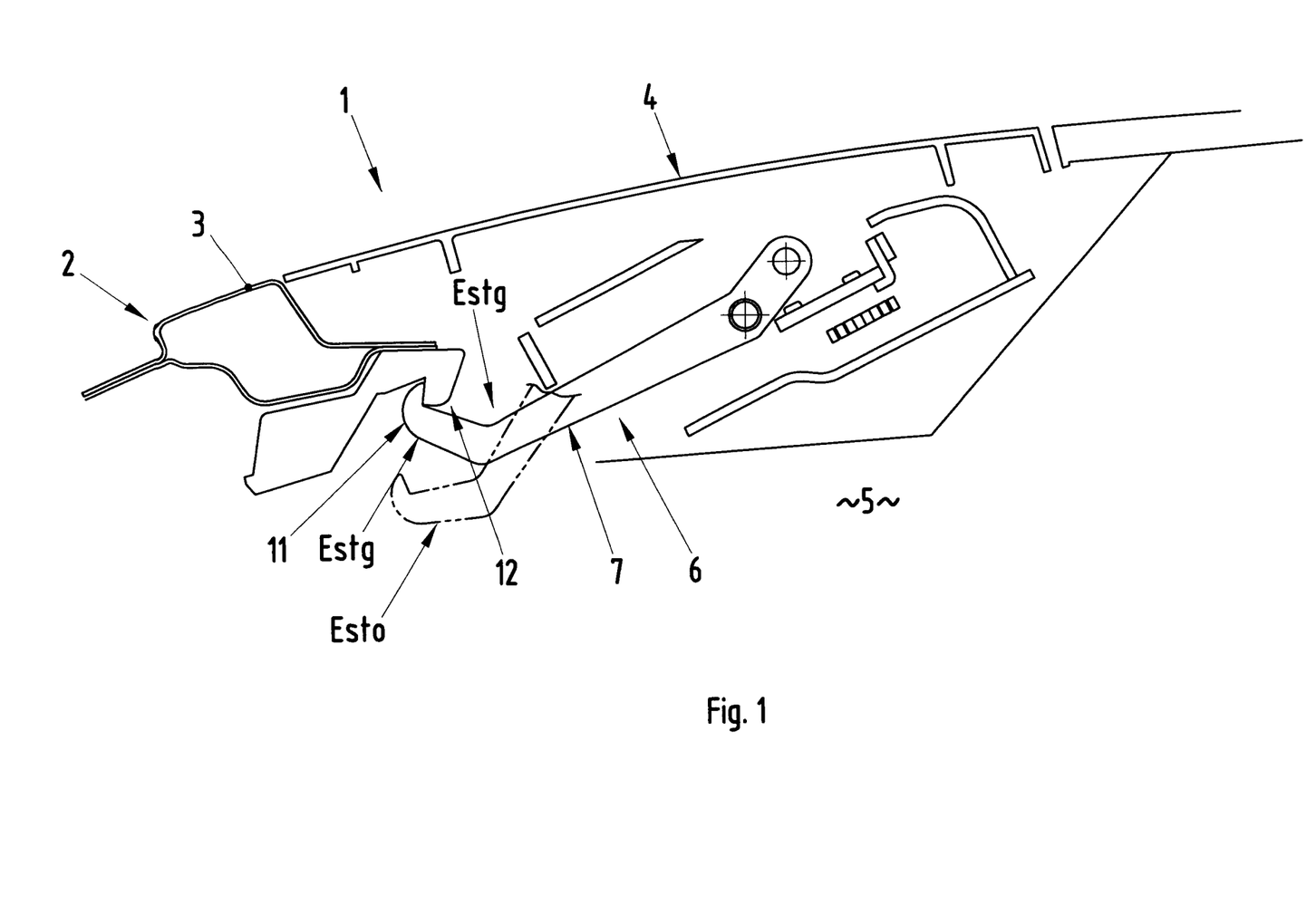
FIG. 1 illustrates a center longitudinal view of a closure assembly for a movable roof of a vehicle in accordance with an embodiment of the present invention.

Referring now to the FIGURES, a closure assembly for a movable roof 4 of a vehicle 1 in accordance with an embodiment of the present invention is shown. Vehicle 1 is a convertible and includes a vehicle body 2 with a front windshield frame 3. Roof 4 is movably connected to vehicle body 2 to move between a closed position in which roof 4 spans passenger compartment 5 of vehicle 1 with a front portion of roof 4 adjoining windshield frame 3 and an opened position in which roof 4 is moved rearwardly to expose passenger compartment 5.

The closure assembly is connected to roof 4 and functions to lock roof 4 in place to vehicle 1 when roof 4 is in the closed roof position. The closure assembly further functions to unlock roof 4 from the closed roof position when roof 4 is to move from the closed roof position to the opened roof position.

Figure 2:
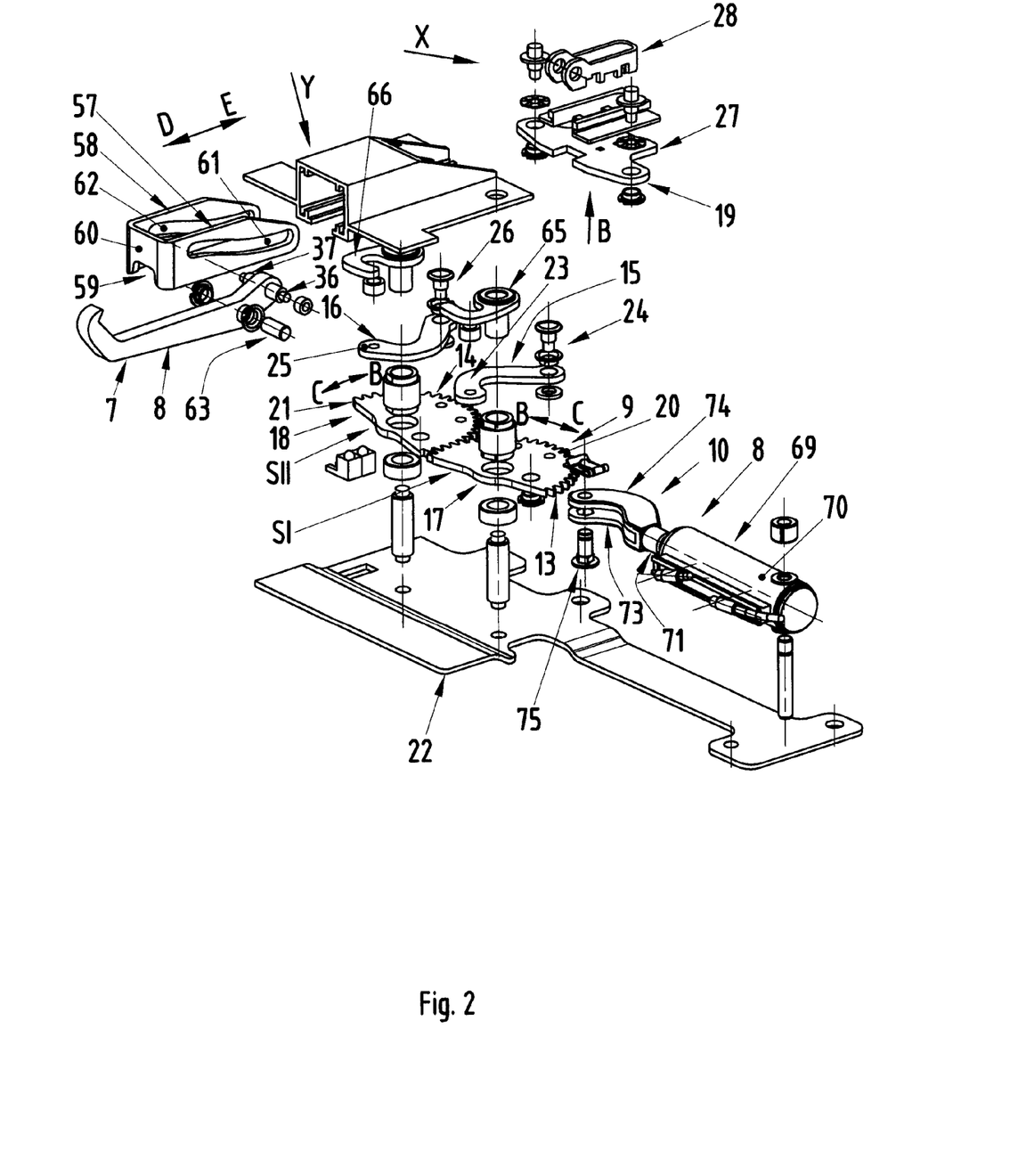
FIG. 2 illustrates disassembled components of the closure assembly in an isometric projection.
Figure 3:
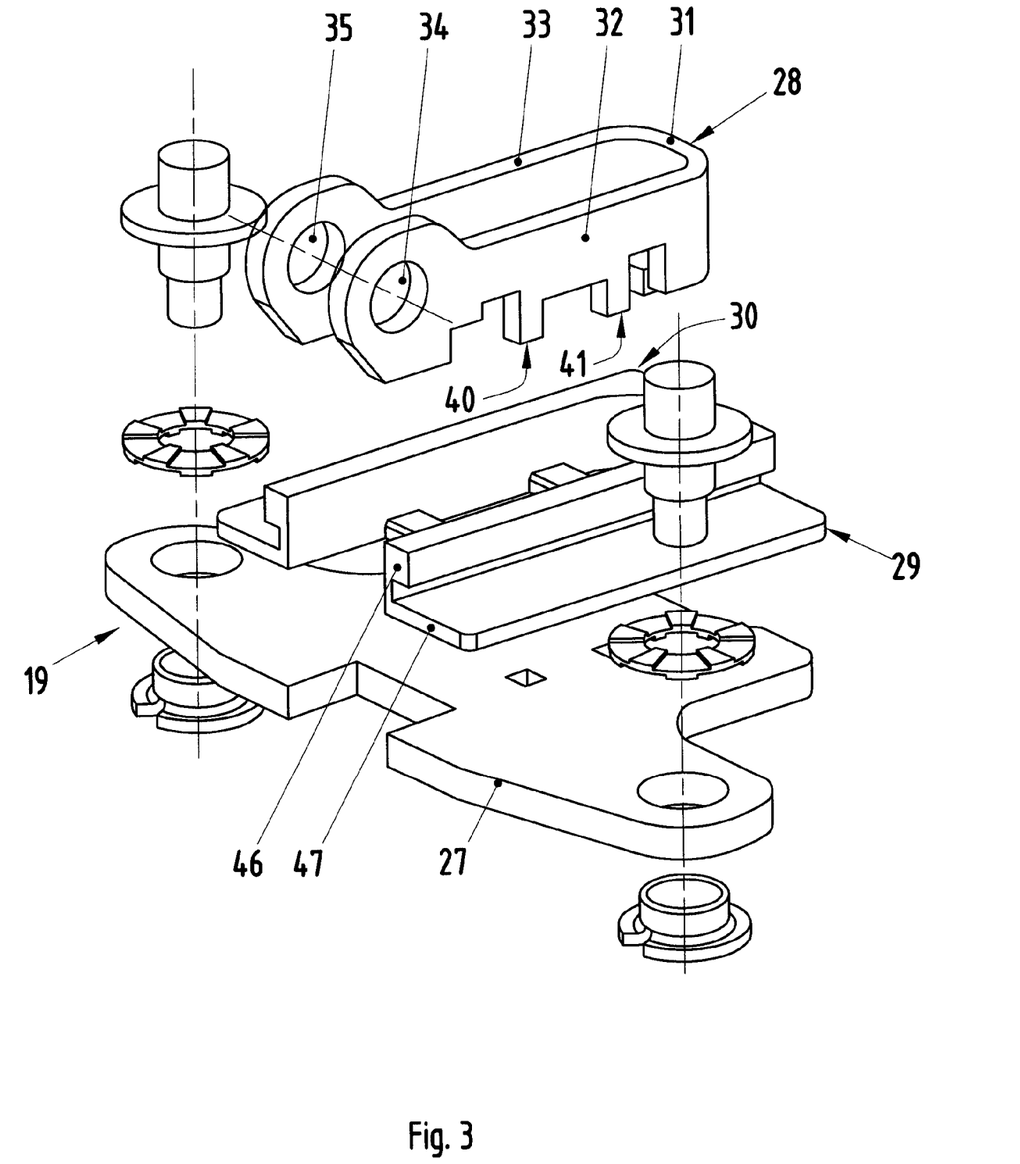
FIG. 3 illustrates the actuator (detail X of FIG. 2) of the closure assembly in enlarged scale.

The closure assembly generally includes a closure 6, a drive unit 10, an actuator 19, a receiving element 52, and a support element 59 (FIGS. 2 and 3).

Closure 6 includes a locking hook 7. Drive unit 10 includes a motor 8 and a gearing assembly 9. Locking hook 7 is movable between a closed end (i.e., locked) position Estg and an opened end (i.e., unlocked) position Esto. In the closed end position Estg, a hook section 11 of locking hook 7 engages a locking hook receptacle 12 on windshield frame 3.

Figure 5:
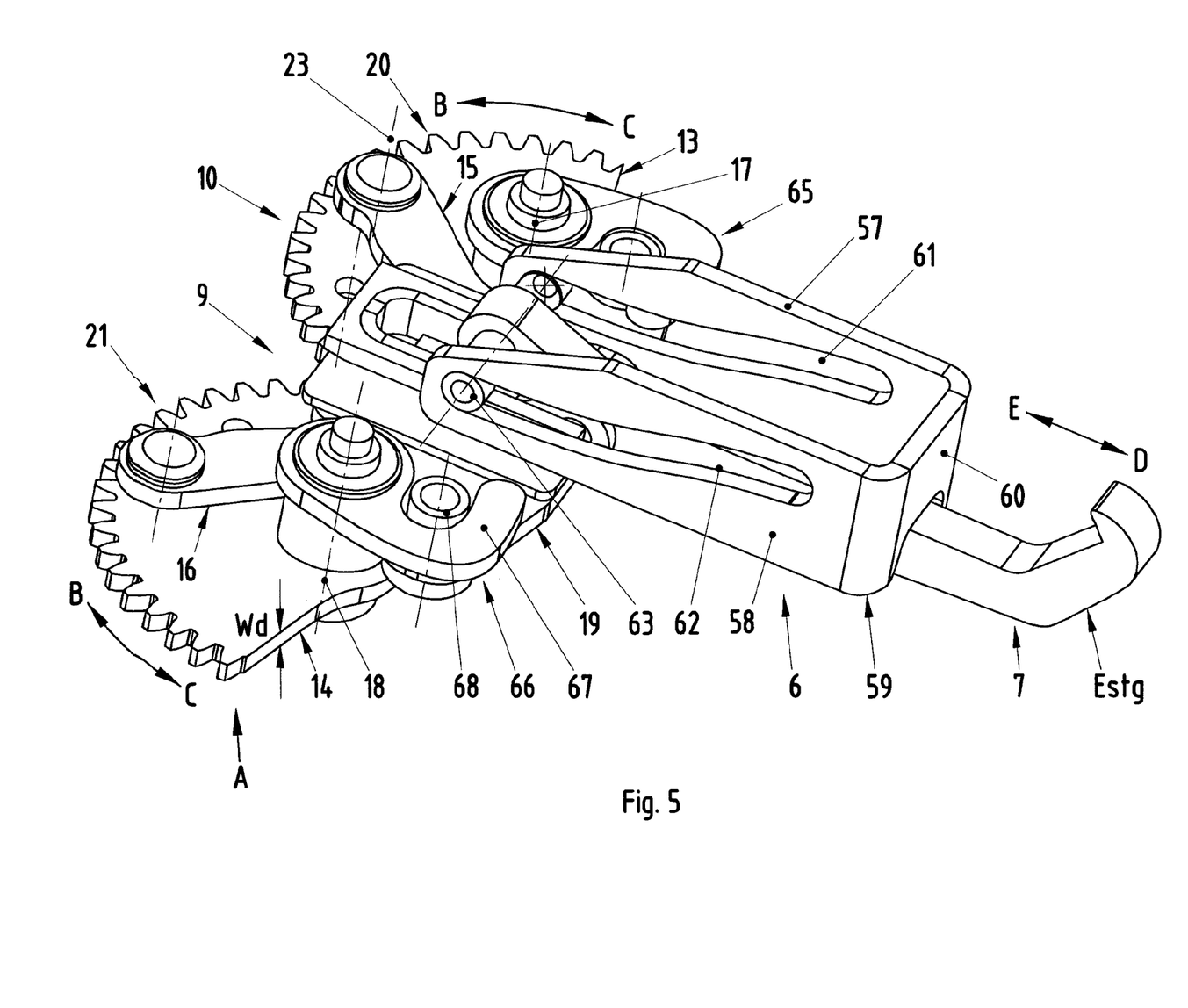
FIG. 5 illustrates an oblique view of a partial region of the closure assembly.
Figure 6:
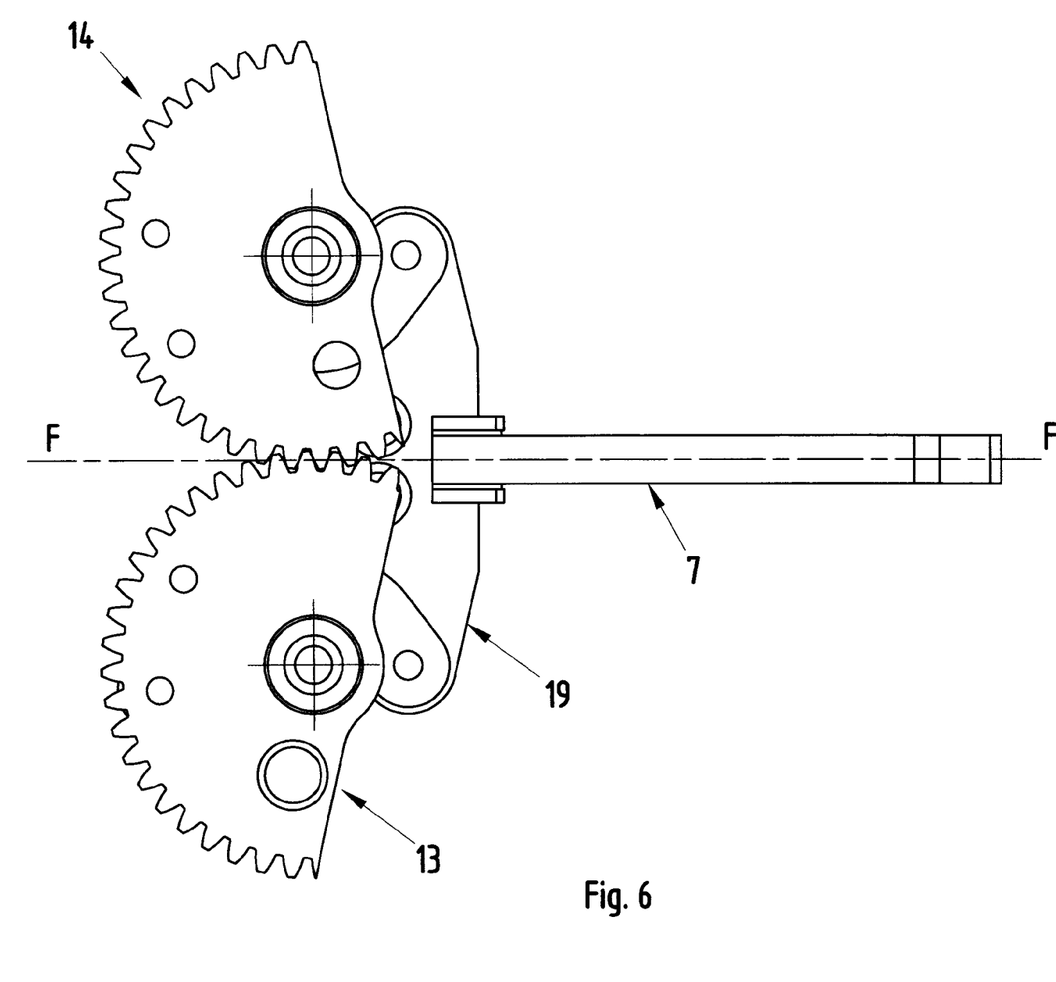
FIG. 6 illustrates a partial view of the closure assembly in arrow direction A of FIG. 5.

Gearing assembly 9 of drive unit 10 includes first and second gearwheels ("gears") 13, 14 and first and second levers 15, 16. Gears 13, 14 have an identical design. Likewise, levers 15, 16 have an identical design. Gears 13, 14 and levers 15, 16 may be made of high-strength metal, plastic, or composite. Gears 13, 14 have respective teeth 20, 21 and are respectively designed as plate-like segments SI, SII having a relatively small wall thickness Wd (FIG. 5). Gears 13, 14 are rotational about rotational axes 17, 18 in directions B-C. Gears 13, 14 are pivotably supported on a base 22 via rotational axes 17, 18. Rotational axes 17, 18 are situated equidistantly with respect to a center longitudinal plane F-F (FIG. 6) of locking hook 7. Teeth 20, 21 of gears 13, 14 engage one another such that gears 13, 14 are mutually engaged. As such, gear 14 rotates about its rotational axis 18 as gear 13 rotates about its rotational axis 17.

Levers 15, 16 respectively cooperate with gears 13, 14 and actuator 19 to couple gears 13, 14 to actuator 19 via respective pairs of swivel axes 23, 24 and 25, 26 of levers 15, 16. Levers 15, 16 cause actuator 19 to move linearly in direction E-D (FIG. 5) such that actuator 19 moves locking hook 7 from the closed end position Estg to the opened end position Esto when gears 13, 14 undergo a first rotary motion about rotational axes 17, 18. Similarly, levers 15, 16 cause actuator 19 to move linearly in direction D-E (FIG. 5) such that actuator 19 moves locking hook 7 from the opened end position Esto to the closed end position Estg when gears 13, 14 undergo an opposite second rotary motion about rotational axes 17, 18.

Figure 7:
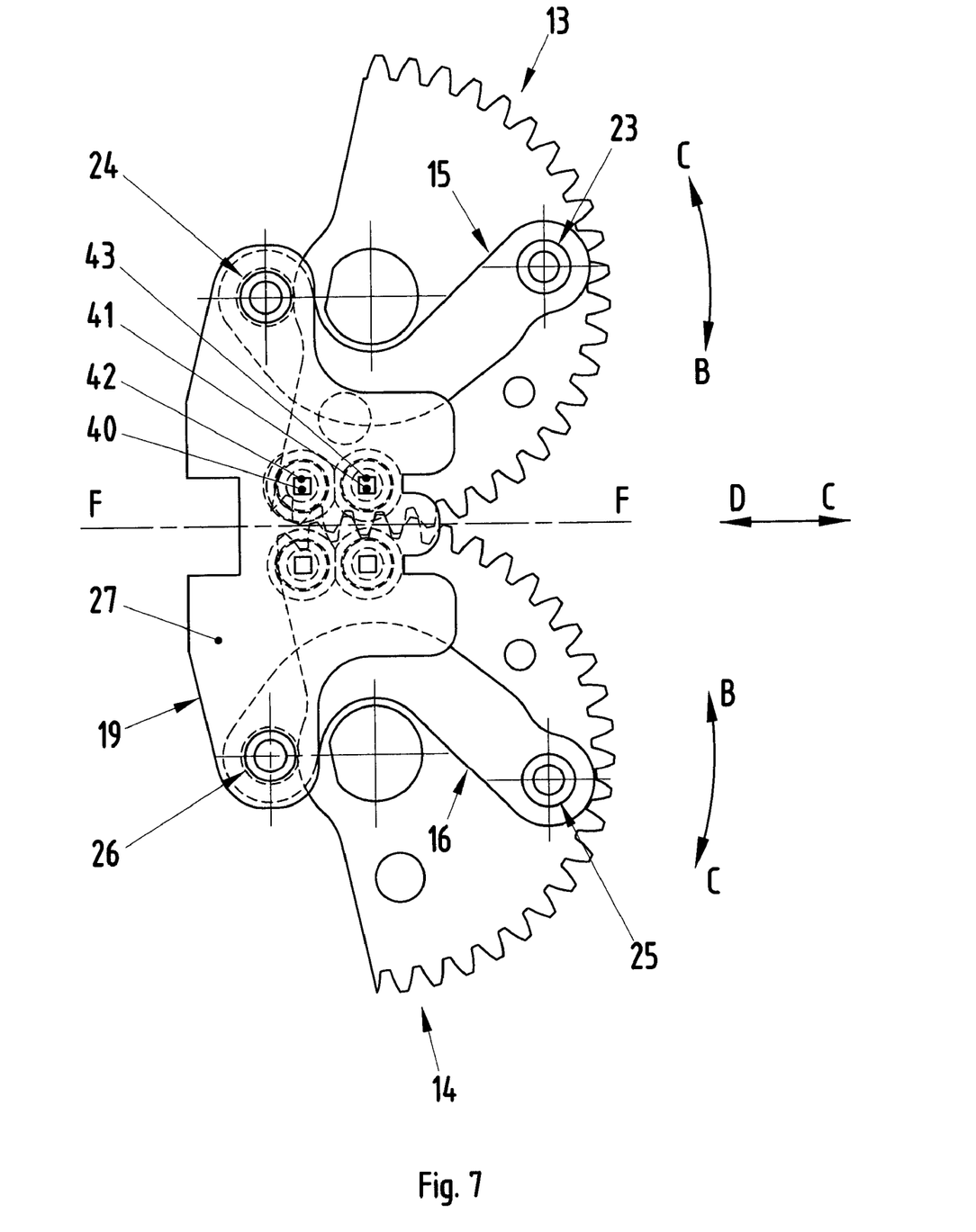
FIG. 7 illustrates a partial view of the closure assembly in arrow direction B of FIG. 2.

Actuator 19 includes a base plate 27, a bearing support bracket 28, and a pair of guide tracks 29, 30 (FIGS. 2 and 3). Bearing support bracket 28 and guide tracks 29, 30 are supported on base plate 27. Bearing support bracket 28 has a U-shaped configuration including a bar 31 and legs 32, 33. Legs 32, 33 include connecting bars 40, 41 projecting from sides facing base plate 27. Connecting bars 40, 41 pass through corresponding openings 42, 43 (FIG. 7) in base plate 27 and project beyond base plate 27 in such a way that a riveted joint may be formed. In other words, bearing support bracket 28 is held in place by rivets on base plate 27.

Legs 32, 33 of bearing support bracket 28 respectively include bearing holes 34, 35. Bearing holes 34, 35 respectively receive bearing pins 36, 37 of locking hook 7 (FIG. 2). Bearing pins 36, 37 are connected to the end of locking hook 7 opposite from hook section 11 of locking hook 7. Bearing holes 34, 35 together with bearing pins 36, 37 form a swivel bearing for locking hook 7 (FIGS. 2 and 3).

Guide tracks 29, 30 of actuator 19 extend approximately equidistantly with respect to a center longitudinal plane F-F (FIG. 6) of base plate 27. Guide tracks 29, 30 each have a U-shaped cross section with horizontally oriented legs 46, 47.

Figure 4:
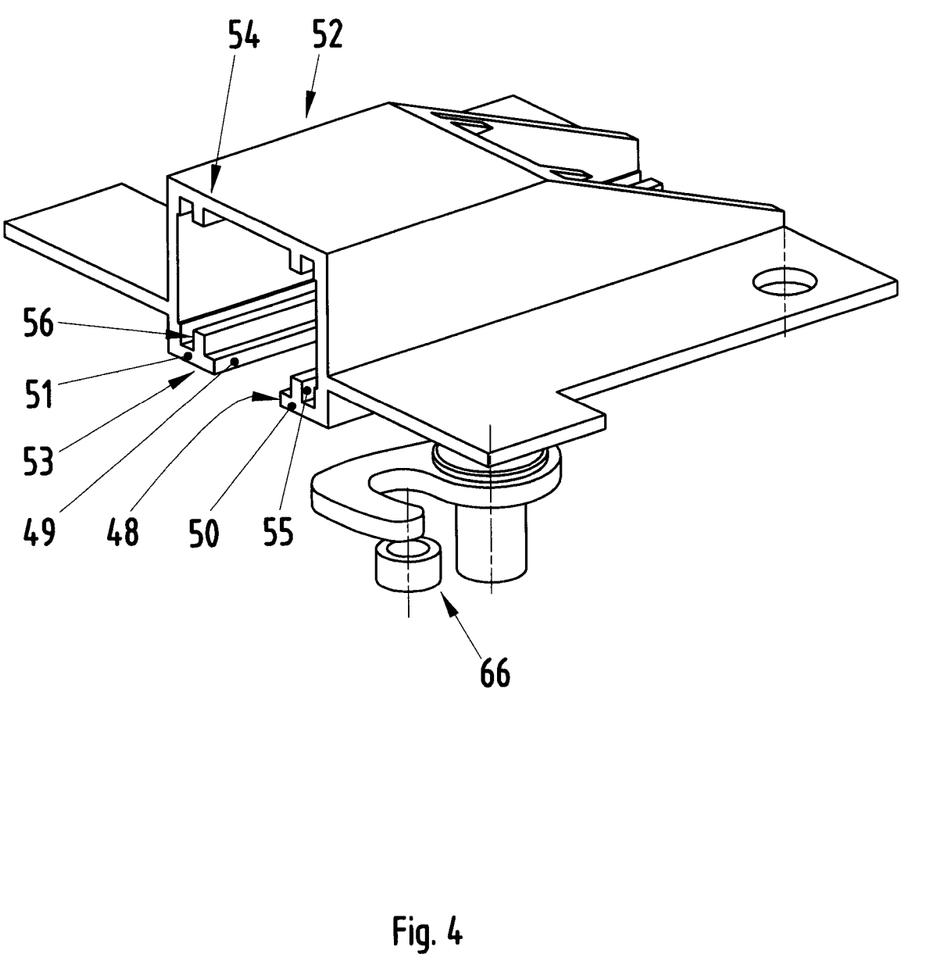
FIG. 4 illustrates the receiving element (detail Y of FIG. 2) in enlarged scale.

Receiving element 52 (FIG. 4) has a C-shaped cross section and includes bars 50, 51 having ends 48, 49. Guide tracks 29, 30 of actuator 19 cooperate with ends 48, 49 of bars 50, 51 of receiving element 52. At opposite sides 53, 54, receiving element 52 includes guide receptacles 55, 56. Guide receptacles 55, 56 have a U-shaped cross-section for receiving legs 57, 58 of slide support 59 (FIG. 2).

Viewed in cross-sectionally, slide support 59 has a U-shaped configuration and includes a bar 60 connecting legs 57, 58 (FIGS. 2 and 5). Legs 57, 58 of slide support 59 include oblong side elements 61, 62. A guide pin 63 of locking hook 7 is movably supported in side elements 61, 62 of legs 57, 58 of slide support 59 (FIGS. 2 and 5). Locking hook 7 is movable between its closed end position Estg and its opened end position Esto via bearing pins 36, 37 and guide pin 63.

Force absorption devices 65, 66 (FIGS. 2 through 5) are between gears 13, 14 and base plate 27. Force absorption devices 65, 66 are activated when locking hook 7 is in its closed end position Estg. Each force absorption device 65, 66 includes a support hook 67 and a retaining pin 68. Support hook 67 and retaining pin 68 of force absorption device 65 are rigidly mounted to gear 13 and base plate 27. Similarly, support hook 67 and retaining pin 68 of force absorption device 66 are rigidly mounted to gear 14 and base plate 27.

As described above, locking hook 7 of closure 6 is actuated by drive unit 10 to move between the closed end position Estg and the opened end position Esto. Drive unit 10 engages with one of the two gears 13, 14 to actuate locking hook 7. (For instance, with reference to FIG. 2, drive unit 10 engages gear 13.) Drive unit 10 may include an electric motor or, in an embodiment, a hydraulic cylinder 69. Hydraulic cylinder 69 includes a cylinder 70 and a piston 71. A fork-shaped connecting element 72 is mounted at the free end of piston 71. Connecting element 72 encloses gear 13 at two fork sections 73, 74 and is held on gear 13 by a linkage pin 75.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A closure assembly for locking and unlocking a movable roof to and from a vehicle frame, the closure assembly comprising:
    a locking hook having first and second ends, the first end of the locking hook having a hook section, wherein the locking hook is movable between a locked position in which the hook section is engageable with the vehicle frame and an unlocked position in which the hook section is disengageable from the vehicle frame;
    an actuator connected to the second end of the locking hook, the actuator linearly movable between a first position in which the actuator causes the locking hook to move to the locked position and a second position in which the actuator causes the locking hook to move to the unlocked position;
    first and second gears; and
    first and second levers;
    wherein the gears are rotatable in a common plane about respective rotational axes and are engaged with one another such that one of the gears rotates in response to the other one of the gears rotating, wherein the first lever is connected at one end to the first gear and is connected at another end to the actuator and the second lever is connected at one end to the second gear and is connected at another end to the actuator, wherein the ends of the levers are connected to the gears and the actuator at respective swivel axes;

wherein the levers move as the gears rotate about the rotational axes in response to the first gear rotating in a first rotary direction and thereby cause the actuator to move linearly in a first direction to thereby move the locking hook to the locked position;

wherein the levers move as the gears rotate about the rotational axes in response to the first gear rotating in a second opposite rotary direction and thereby cause the actuator to move linearly in a second opposite direction to thereby move the locking hook to the unlocked position.

2. The closure assembly of claim 1 further comprising:
a base supporting the locking hook, the actuator, the gears, and the levers, wherein the base is connectable to the movable roof.

3. The closure assembly of claim 1 wherein:
the rotational axes of the gears are situated equidistantly with respect to a center longitudinal plane of the locking hook.

4. The closure assembly of claim 1 wherein:
the gears are identical to one another.

5. The closure assembly of claim 1 wherein:
the levers are identical to one another.

6. The closure assembly of claim 1 further comprising:
a drive unit engaged with one of the gears for actuating the gears to rotate.

7. The closure assembly of claim 6 wherein:
the drive unit includes a hydraulic cylinder.

8. A closure assembly for locking and unlocking a movable roof to and from a vehicle frame, the closure assembly comprising:
a locking hook having first and second ends, the first end of the locking hook having a hook section, wherein the locking hook is movable between a locked position in which the hook section is engageable with the vehicle frame and an unlocked position in which the hook section is disengageable from the vehicle frame;
an actuator connected to the second end of the locking hook, the actuator linearly movable between a first position in which the actuator causes the locking hook to move to the locked position and a second position in which the actuator causes the locking hook to move to the unlocked position;
first and second gears; and
first and second levers;
wherein the gears are rotatable in a common plane about respective rotational axes and are engaged with one another such that one of the gears rotates in response to the other one of the gears rotating, wherein the first lever is connected at one end to the first gear and is connected at another end to the actuator and the second lever is connected at one end to the second gear and is connected at another end to the actuator;
wherein the levers move as the gears rotate about the rotational axes in response to the first gear rotating in a first rotary direction and thereby cause the actuator to move linearly in a first direction to thereby move the locking hook to the locked position;
wherein the levers move as the gears rotate about the rotational axes in response to the first gear rotating in a second opposite rotary direction and thereby cause the actuator to move linearly in a second opposite direction to thereby move the locking hook to the unlocked position;
wherein each gear is a plate-like segment having teeth, wherein the teeth of the gears are engaged with one another such that the gears are engaged with one another.

9. A closure assembly for locking and unlocking a movable roof to and from a vehicle frame, the closure assembly comprising:
a locking hook having first and second ends, the first end of the locking hook having a hook section, wherein the locking hook is movable between a locked position in which the hook section is engageable with the vehicle frame and an unlocked position in which the hook section is disengageable from the vehicle frame;
an actuator connected to the second end of the locking hook, the actuator linearly movable between a first position in which the actuator causes the locking hook to move to the locked position and a second position in which the actuator causes the locking hook to move to the unlocked position;
first and second gears; and
first and second levers;
wherein the gears are rotatable in a common plane about respective rotational axes and are engaged with one another such that one of the gears rotates in response to the other one of the gears rotating, wherein the first lever is connected at one end to the first gear and is connected at another end to the actuator and the second lever is connected at one end to the second gear and is connected at another end to the actuator;
wherein the levers move as the gears rotate about the rotational axes in response to the first gear rotating in a first rotary direction and thereby cause the actuator to move linearly in a first direction to thereby move the locking hook to the locked position;
wherein the levers move as the gears rotate about the rotational axes in response to the first gear rotating in a second opposite rotary direction and thereby cause the actuator to move linearly in a second opposite direction to thereby move the locking hook to the unlocked position;
wherein the actuator includes a base plate, a bearing support bracket, and guide tracks.

10. The closure assembly of claim 9 wherein:
the bearing support bracket includes a swivel bearing, wherein the second end of the locking hook is connected to the swivel bearing.

11. The closure assembly of claim 10 wherein:
the bearing support bracket has a U-shaped configuration and includes a pair of legs connected at one end by a bar, wherein each leg includes a bearing hole for the swivel bearing of the bearing support bracket.

12. The closure assembly of claim 11 wherein:
the legs of the bearing support bracket have with a plurality of connecting bars, wherein the connecting bars are passed through corresponding openings in the base plate to connect the bearing support bracket to the base plate.

13. The closure assembly of claim 9 further comprising:
a receiving element;
wherein the guide tracks of the actuator are movably connected to the receiving element such that the actuator is linearly movable between the first and second positions relative to the receiving element.

14. The closure assembly of claim 13 further comprising:
a slide support having a pair of slide receptacles receiving a pair of guide pins of the second end of the locking hook such that the second end of the locking hook is connected to the slide support;
wherein the slide support is connected to the receiving element.

15. The closure assembly of claim 14 wherein:
the slide support has a U-shaped configuration with a pair of legs connected by a bar, and the legs of the slide support respectively include the slide receptacles.

16. A closure assembly for locking and unlocking a movable roof to and from a vehicle frame, the closure assembly comprising:
a locking hook having first and second ends, the first end of the locking hook having a hook section, wherein the locking hook is movable between a locked position in which the hook section is engageable with the vehicle frame and an unlocked position in which the hook section is disengageable from the vehicle frame;
an actuator connected to the second end of the locking hook, the actuator linearly movable between a first position in which the actuator causes the locking hook to move to the locked position and a second position in which the actuator causes the locking hook to move to the unlocked position;
first and second gears;
first and second levers; and
first and second force absorption devices, wherein the first absorption device is between the first gear and the actuator, and the second absorption device is between the second gear and the actuator;
wherein the gears are rotatable in a common plane about respective rotational axes and are engaged with one another such that one of the gears rotates in response to the other one of the gears rotating, wherein the first lever is connected at one end to the first gear and is connected at another end to the actuator and the second lever is connected at one end to the second gear and is connected at another end to the actuator;
wherein the levers move as the gears rotate about the rotational axes in response to the first gear rotating in a first rotary direction and thereby cause the actuator to move linearly in a first direction to thereby move the locking hook to the locked position;
wherein the levers move as the gears rotate about the rotational axes in response to the first gear rotating in a second opposite rotary direction and thereby cause the actuator to move linearly in a second opposite direction to thereby move the locking hook to the unlocked position.

17. The closure assembly of claim 16 wherein:
each force absorption device includes a support hook and a retaining pin.

18. An assembly comprising:
a movable roof; and
a closure for locking and unlocking the roof to and from a frame, the closure including a locking hook, an actuator, first and second gears, first and second levers, and a base;
the locking hook having first and second ends, the first end of the locking hook having a hook section, wherein the locking hook is movable between a locked position in which the hook section is engageable with the frame and an unlocked position in which the hook section is disengageable from the frame;
the actuator connected to the second end of the locking hook, the actuator linearly movable between a first position in which the actuator causes the locking hook to move to the locked position and a second position in which the actuator causes the locking hook to move to the unlocked position;
wherein the gears are rotatable in a common plane about respective rotational axes and are engaged with one another such that one of the gears rotates in response to the other one of the gears rotating, wherein the first lever is connected at one end to the first gear and is connected at another end to the actuator and the second lever is connected at one end to the second gear and is connected at another end to the actuator;
wherein the levers move as the gears rotate about the rotational axes in response to the first gear rotating in a first rotary direction and thereby cause the actuator to move linearly in a first direction to thereby move the locking hook to the locked position;
wherein the levers move as the gears rotate about the rotational axes in response to the first gear rotating in a second opposite rotary direction and thereby cause the actuator to move linearly in a second opposite direction to thereby move the locking hook to the unlocked position;
wherein the base supports the locking hook, the actuator, the gears, and the levers, wherein the base is connected to the roof.

19. The assembly of claim 18 further comprising:
a drive unit engaged with one of the gears for actuating the gears to rotate.

* * * * *